(12) United States Patent
Ishii et al.

(10) Patent No.: US 6,336,004 B1
(45) Date of Patent: Jan. 1, 2002

(54) DISTANCE MEASURING EQUIPMENT AND CAMERA

(75) Inventors: Shuichi Ishii; Takaaki Kotani; Seimei Ushiro, all of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/559,721

(22) Filed: Apr. 28, 2000

(30) Foreign Application Priority Data

| Apr. 28, 1999 | (JP) | ................................. 11-121781 |
| Apr. 28, 1999 | (JP) | ................................. 11-121786 |
| Apr. 28, 1999 | (JP) | ................................. 11-121791 |
| Apr. 5, 2000 | (JP) | ................................. 12-102909 |

(51) Int. Cl.$^7$ .......................... G03B 7/08; G03B 13/36; G03B 15/05

(52) U.S. Cl. ...................... 396/59; 396/106; 396/100; 396/159

(58) Field of Search ................. 396/106, 115, 396/100, 120, 159, 56, 59, 57, 58, 104

(56) References Cited

U.S. PATENT DOCUMENTS

| 4,385,817 A | * | 5/1983 | Saito ........................ 396/106 |
| 4,477,168 A | * | 10/1984 | Hosoe ....................... 396/106 |
| 4,760,418 A | * | 7/1988 | Ishizaki et al. ......... 396/159 X |
| 5,014,080 A | * | 5/1991 | Miyadera ................ 396/106 X |
| 5,323,222 A | * | 6/1994 | Kunishige .............. 396/106 X |

FOREIGN PATENT DOCUMENTS

| JP | 5-18745 | 1/1993 | ............ G01C/3/06 |

\* cited by examiner

*Primary Examiner*—W. B. Perkey
(74) *Attorney, Agent, or Firm*—Sughrue Mion, PLLC (57) ABSTRACT

There is disclosed a distance measuring equipment capable of enhancing an accuracy of focusing, and a camera capable of enhancing an accuracy of focusing and/or reducing a cost with a small scale of circuit. In the event that a photography is performed at the relatively short distance, first and second switches of an SPD are switched by an MPU to turn off and turn on, respectively. An AF-dedicated photo detector circuit determines a distance up to a subject in accordance with both the photo-currents $I_1$ and $I_2$ obtained through two signal electrodes. On the other hand, in case of the relatively long distance, the MPU switches the first and second switches of the SPD are switched to turn off and turn on, respectively, so that another AF-dedicated photo detector circuit determines a distance up to the subject in accordance with photo-current $I_3$ obtained from one of the signal electrodes. In this manner, in the event that a photography is performed at the relatively long distance, there is performed a processing of determining a distance up to the subject in accordance with a total quantity of light.

16 Claims, 6 Drawing Sheets

DISTANCE MEASURING EQUIPMENT AND CAMERA

BACKGROUND OF THE INVENTION

1. Field of the Invention

The present invention relates to a distance measuring equipment for measuring a distance up to a target to be measured in distance using a semiconductor photo detector element such as a silicon photo diode (SPD), and a camera incorporated thereinto such a distance measuring equipment.

2. Description of the Related Art

Hitherto, there is widely spread a camera incorporating thereinto an automatic focusing (AF) device, which is generally referred to as an active type. Such an active type of automatic focusing device adopts a system for measuring a distance up to a camera subject in such a manner that an AF light projection unit and an AF photo detection unit are disposed at intervals of a predetermined base length, light is projected from the AF light projection unit to the camera subject, and light reflected on the camera subject is detected by the AF photo detection unit. As a photo detector element for focusing, for example, a semiconductor element such as an SPD element, which will be described later, is used. In some case, a camera is provided with an automatic flash emission device (an automatic electronic flash device) in which at the time of a photography a flash is projected to a camera subject, a reflected light from the camera subject is detected, and a flash emission is stopped at a timing that the reflected light reaches a predetermined light quantity, and a remote control device for instructing an execution of an operation (for example, a self-timer operation) according to a received light from a remote control equipment (for example, for a self-timer) for controlling the camera in accordance with an emission of light directed to the camera, as well as an automatic focusing device. In such a case, in the camera, the automatic electronic flash device and the remote control device are provided with semiconductor photo detector elements represented by the SPD element, in addition to the semiconductor photo detector element for the automatic focus (AF).

Figure 9:
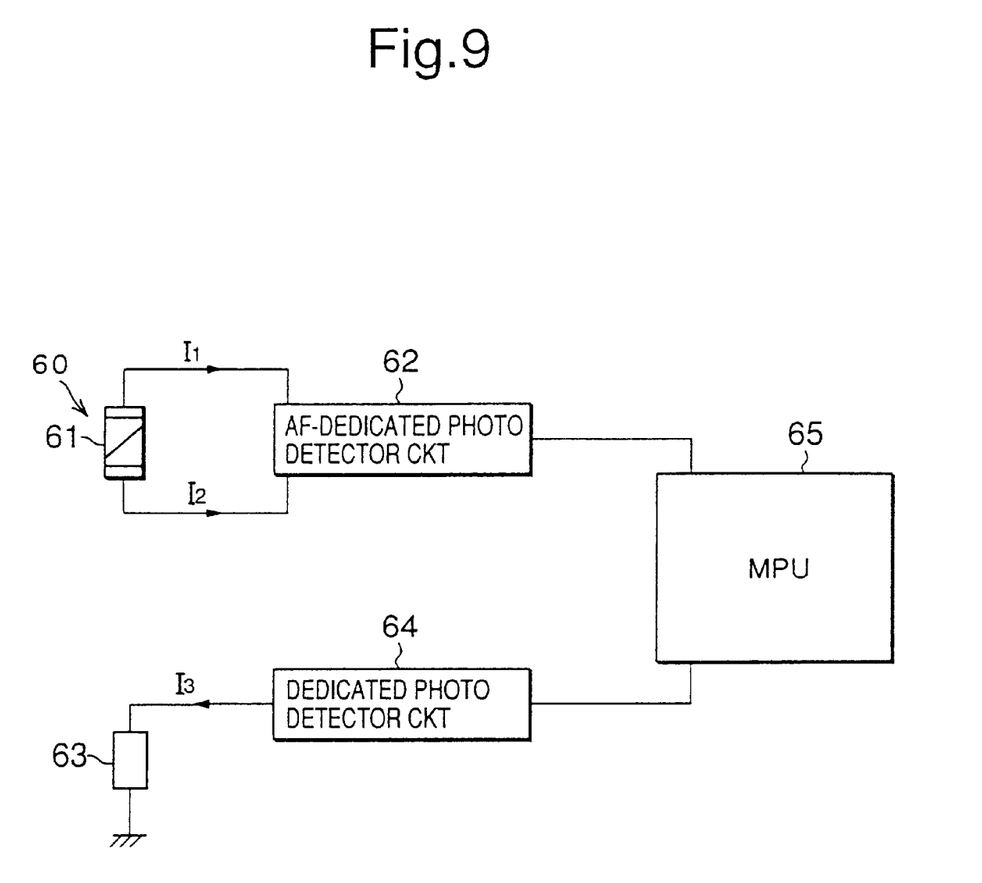
FIG. 9 is a diagram of semiconductor photo detector elements incorporated into the respective devices and their associated circuits, with respect to the conventional camera.

FIG. 9 is a diagram of semiconductor photo detector elements incorporated into the respective devices and their associated circuits, with respect to the conventional camera.

In FIG. 9, there are shown an SPD 60, which is one example of the semiconductor photo detector element for the automatic focus (AF), and an AF-dedicated photo detector circuit 62, which are provided in an automatic focusing device; and an SPD 63 provided in another device and a dedicated photo detector 64 for the another device. The AF-dedicated photo detector 62 and the dedicated photo detector circuit 64 are connected to an MPU (Micro Processor Unit) 65 serving as a control unit. Here, there will be explained a case where the camera is provided with an automatic electronic flash device as the "another device".

The SPD 60 shown in FIG. 9 has a detection surface 61 which is divided into two detection areas. The SPD 60 generates a photo-current in such a manner that light for focusing is projected from an AF light projection unit (not illustrated) to a camera subject and the light for focusing reflected on the camera subject is detected on the two detection areas of the detection surface 61. The photo-current thus generated is separated into photo-currents $I_1$ and $I_2$ in accordance with light quantities irradiated onto the two detection areas of the detection surface 61, respectively, and the photo-currents $I_1$ and $I_2$ are fed to the AF-dedicated photo detector circuit 62. The AF-dedicated photo detector circuit 62 determines a distance up to the camera subject in accordance with both the photo-currents $I_1$ and $I_2$. The MPU 65 controls a lens driving for focusing in accordance with the distance thus determined.

On the other hand, the SPD 63 detects the reflected light from the camera subject through the flash projected to the camera subject from an automatic electronic flash device at the time of photography. A photo-current $I_3$ generated through the detection by the SPD 63 conducts via the dedicated photo detector circuit 64. The dedicated photo detector circuit 64 integrates the photo-current $I_3$ and outputs a signal to stop the flashing operation of the automatic electronic flash device in the timing that the integrated photo-current $I_3$ reaches a predetermined quantity of reflected light. This signal is transmitted to the MPU 65 as well as a flash emission stop control unit (not illustrated). The MPU 65 performs a control of shutter closing and the like in accordance with this signal.

As mentioned above, in some case, the conventional camera is provided with an automatic electronic flash device and a remote control device as well as an automatic focusing device. In such a camera, although the photo detection wavelengths of those devices are mutually closed, those devices are individually provided with their dedicated photo detector elements. Thus, the conventional camera is associated with a problem that the number of photo detector elements is increased, and as a result a circuit scale is enlarged. Accordingly, there is also raised a problem that the cost is increased.

Further, there is proposed a technology (cf. Japanese Patent Application Laid Open Gazette Hei.7-260475) in which in stead of the AF-dedicated photo detector circuit 62, the signal of the photo-current is subjected to an A/D conversion and then is operated. However, also in accordance with this technology, the number of photo detector elements is not decreased. This technology is also associated with a problem that the cost is increased.

In order to solve those problems, it is considered that one semiconductor photo detector element is used on a common basis for the automatic focusing device and another device. However, control and processing method for photo detection signals in the automatic focusing device are different from those in another device, for example, an automatic electronic flash device. Therefore, it is difficult for another device to use an AF-dedicated photo detector circuit for processing photo-current from the semiconductor photo detector element as a photo detector circuit as it is.

Further, the camera incorporated therein an automatic focusing device is also associated with an additional problem that as to focusing for distance, an accuracy of focusing is lowered.

SUMMARY OF THE INVENTION

In view of the foregoing, it is an object of the present invention to provide a distance measuring equipment capable of enhancing an accuracy of focusing, and a camera capable of enhancing an accuracy of focusing and/or reducing a cost with a small scale of circuit.

To achieve the above-mentioned object, the present invention provides a distance measuring equipment comprising:

a light projecting unit for projecting light for a distance measurement; and a photo detector unit, having a light detection window disposed at an interval of a predetermined distance from said light projecting unit in a direction intersecting with a direction of travel of light projected from said light projecting unit, for determining a distance up to a subject in such a manner that light is projected from said light projecting unit, and light reflected on the subject is detected through said light detection window, wherein said photo detector unit comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal;

a first distance arithmetic unit for determining a distance up to the subject in accordance with a plurality of photo-currents derived through said signal electrodes, in a state that said first switch is changed over to the second state; and a second distance arithmetic unit for determining a distance up to the subject in accordance with the photo-current derived through a first signal electrode which is one of said signal electrodes, in a state that said first switch is changed over to the first state.

According to the distance measuring equipment of the present invention as mentioned above, there are provided the first and second distance arithmetic units for determining a distance up to the subject in accordance with the mutually different focusing algorithms. Thus, it is possible to extend a possible focusing range of distance and also possible to perform a distance measurement with greater accuracy.

In the semiconductor photo detector element, which is used in the distance measuring equipment of the present invention as mentioned above, it is acceptable that said semiconductor photo detector element further comprises a second switch, provided in association with another signal electrode excepting said first signal electrode, for selectively offering a first state which permits the photo-current generated on said detection surface to conduct into the associated signal electrode, and a second state which inhibits the photo-current generated on said detection surface from conducting into the associated signal electrode, in accordance with a control signal, said first distance arithmetic unit determines a distance up to the subject in accordance with a plurality of photo-currents derived through said signal electrodes, in a state that said first switch is changed over to the second state, and said second switch is changed over to the first state, and a second distance arithmetic unit for determining a distance up to the subject in accordance with the photo-current derived through said first signal electrode, in a state that said first switch is changed over to the first state, and said second switch is changed over to the second state.

In the distance measuring equipment of the present invention as mentioned above, it is acceptable that said semiconductor photo detector element further comprises a switch element, provided in association with another signal electrode excepting said first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, said first distance arithmetic unit determines a distance up to the subject in accordance with a plurality of photo-currents derived through said signal electrodes, in a state that said first switch is changed over to the second state, and said switch element is changed over to the first state, and a second distance arithmetic unit for determining a distance up to the subject in accordance with the photo-current derived through said first signal electrode, in a state that said first switch is changed over to the first state, and said switch element is changed over to the second state.

In the distance measuring equipment of the present invention as mentioned above, and a camera of the present invention, which will be described later, said first state is a low impedance state, and said second state is a high impedance state. However, the first state and the second state are not always restricted to the low impedance state and the high impedance state, but the first state is a state that permits the photo-current generated on the detection surface to conduct through a switch, and the second state is a state that inhibits the photo-current generated on the detection surface from conducting through the switch.

To achieve the above-mentioned object, the present invention provides a first camera loaded with a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said photo detector unit comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal;

a control unit for generating a control signal to change over said first switch and transmitting the control signal to said semiconductor photo detector element;

a first distance arithmetic unit for determining a distance up to the subject in accordance with a plurality of photo-currents derived through said signal electrodes, in a state that a control signal to change over said first switch to said second state is transmitted to said semiconductor photo detector element by said control unit; and a second distance arithmetic unit for determining a distance up to the subject in accordance with the photo-current derived through a first signal electrode which is one of said signal electrodes, in a state that a control signal to change over said first switch to said first state is transmitted to said semiconductor photo detector element by said control unit.

According to the first camera of the present invention as mentioned above, there are provided the first and second distance arithmetic units for determining a distance up to the subject in accordance with the mutually different focusing algorithms. Thus, it is possible to extend a possible focusing range of distance and also possible to perform a distance measurement with greater accuracy.

For example, according to an embodiment of the present invention which will be described later, in the event that a photography is performed at the relatively short distance, the first switch of the semiconductor photo detector element is switched by the control unit to offer the high impedance state which is an example of the first state mentioned above. Thus, the first distance arithmetic unit determines a distance up to a subject in accordance with both the photo-currents obtained through the pair of signal electrodes of the semiconductor photo detector element. On the other hand, in the event that a photography is performed at the relatively long distance, the first switch of the semiconductor photo detector element is switched by the control unit to offer the low impedance state which is an example of the second state mentioned above. Thus the second distance arithmetic unit determines a distance up to a subject in accordance with photo-current obtained from one of the pair of signal electrodes of the semiconductor photo detector element. In this manner, in the event that a photography is performed at the relatively long distance, there is performed a processing of determining a distance up to the subject in accordance with a total quantity of light. Thus, it is possible to enhance accuracy of focusing in focusing of the long distance.

To achieve the above-mentioned object, the present invention provides a second camera loaded with a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, said semiconductor photo detector element being used on a common basis for said flash emission device and said distance measuring equipment and serving to detect both flash reflected on the subject and incident through said light detection window and light for focusing reflected on the subject and incident through said light detection window; and a control unit for generating a control signal to change over said first switch between said first state and said second state and transmitting the control signal to said semiconductor photo detector element.

According to the second camera of the present invention as mentioned above, there is adopted the semiconductor photo detector element having the above-mentioned first switch. That is, the semiconductor photo detector element is used on a common basis for the flash emission device and the distance measuring equipment. This feature makes it possible for the semiconductor photo detector element to serve to detect both flash reflected on the subject and light for focusing reflected on the subject. Thus, according to the second camera of the present invention, as compared with the conventional camera in which photo detector elements are provided individually for the flash emission device and the distance measuring equipment, it is possible to reduce the number of photo detector elements.

To achieve the above-mentioned object, the present invention provides a third camera loaded with a remote control device responsive to light from a remote control equipment for controlling the camera in accordance with an emission of light directed to the camera for instructing an execution of operation according to detection of the light, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, said semiconductor photo detector element being used on a common basis for said remote control device and said distance measuring equipment and serving to detect both light emitted from said remote control equipment and incident through said light detection window and light for focusing reflected on the subject and incident through said light detection window; and a control unit for generating a control signal to change over said first switch between said first state and said second state and transmitting the control signal to said semiconductor photo detector element.

According to the third camera of the present invention as mentioned above, there is adopted the semiconductor photo detector element having the above-mentioned first switch. This feature makes it possible for the semiconductor photo detector element to serve to detect both light emitted from the remote control equipment and light for focusing reflected on the subject. Thus, according to the third camera of the present invention, as compared with the conventional camera in which photo detector elements are provided individually for the remote control device and the distance measuring equipment, it is possible to reduce the number of photo detector elements.

To achieve the above-mentioned object, the present invention provides a fourth camera loaded with a remote control device responsive to light from a remote control equipment for controlling the camera in accordance with an emission of light directed to the camera for instructing an execution of operation according to detection of the light, a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, said semiconductor photo detector element being used on a common basis for said remote control device, said flash emission device and said distance measuring equipment and serving to detect three types of light emitted from said remote control equipment and incident through said light detection window, flash reflected on the subject and incident through said light detection window and light for focusing reflected on the subject and incident through said light detection window; and a control unit for generating a control signal to change over said first switch between said first state and said second state and transmitting the control signal to said semiconductor photo detector element.

According to the fourth camera of the present invention as mentioned above, there is adopted the semiconductor photo detector element having the above-mentioned first switch. This feature makes it possible for the semiconductor photo detector element to serve to detect three types of light emitted from the remote control equipment, flash reflected on the subject and light for focusing reflected on the subject. Thus, according to the fourth camera of the present invention, as compared with the conventional camera in which photo detector elements are provided individually for the remote control device, the flash emission device and the distance measuring equipment, it is possible to reduce the number of photo detector elements.

In any of the first to fourth cameras of the present invention as mentioned above, it is acceptable that said semiconductor photo detector element further comprises a second switch, provided in association with another signal electrode excepting the first signal electrode which is one of said signal electrodes, for selectively offering a first state which permits the photo-current generated on said detection surface to conduct into the associated signal electrode, and a second state which inhibits the photo-current generated on said detection surface from conducting through the associated signal electrode, in accordance with a control signal, and said control unit generates a control signal to change over said first switch and said second switch in such a manner that when one of said first switch and said second switch is in the first state, another switch is in the second state, and transmits the control signal to said semiconductor photo detector element.

In any of the first to fourth cameras of the present invention as mentioned above, it is acceptable that said semiconductor photo detector element further comprises a switch element, provided in association with another signal electrode excepting the first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, and said control unit generates a control signal to change over said first switch and said switch element in such a manner that when one of said first switch and said switch element is in the first state, another switch is in the second state, and transmits the control signal to said semiconductor photo detector element and said switch element.

DETAILED DESCRIPTION OF PREFERRED EMBODIMENTS

Embodiments of the present invention will be described with reference to the accompanying drawings.

Figure 1:
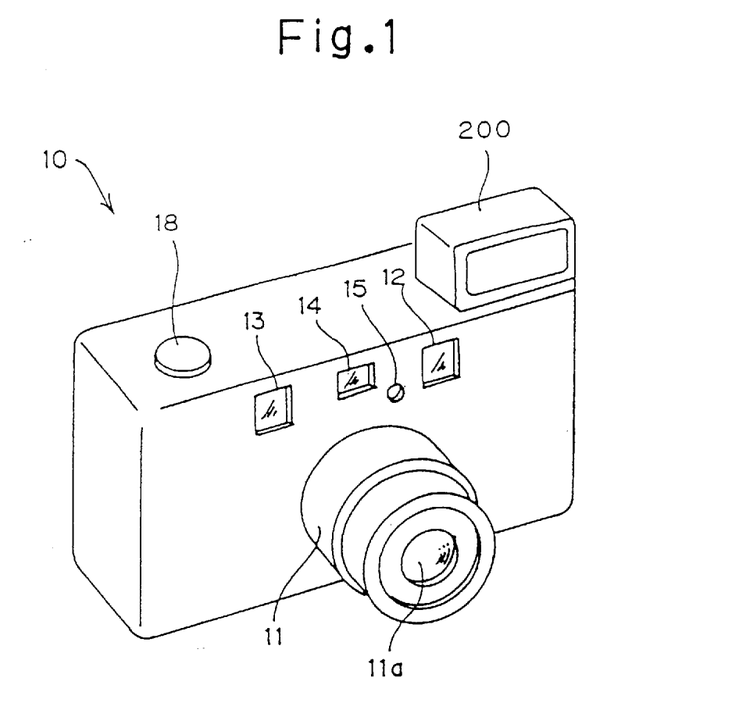
FIG. 1 is a perspective view of a camera according to an embodiment of the present invention, looking obliquely upper from the front.

FIG. 1 is a perspective view of a camera according to an embodiment of the present invention, looking obliquely upper from the front.

A camera 10 shown in FIG. 1 incorporates therein an automatic focusing (AF) device generally referred to as an active type, and is for performing a photography on a roll-like shaped photographic film. The AF device incorporated in the camera corresponds to an embodiment of a distance measuring equipment of the present invention.

At the front central portion of the camera 10, there is provided a zoom barrel 11 in which an optical zoom lens 11a is built. The camera 10 is provided with an automatic electronic flash device (corresponding to an embodiment of a flash emission device referred to in the present invention) and a remote control device as well as the automatic focusing device.

The automatic focusing device comprises a light projecting unit, having an AF light projection window 12 disposed at the front upper portion of the camera 10, for projecting light for focusing from the AF light projection window 12 in front of the camera 10,, and a photo detector unit, having an AF light detection window 13 disposed at the front portion of the camera 10 and at an interval of a predetermined distance from the AF light projection window 12, for determining a distance up to a camera subject in such a manner that light is projected from the AF light projection window 12 in front of the camera 10, and light reflected on the camera subject is detected through the AF light detection window 13. The photo detector unit is provided with a PSD, which is a kind of semiconductor photo detector element referred to in the present invention, disposed behind the AF light detection window 13. The photo detector unit will be described in detail later.

On the top of the camera 10, there is provided a light emission unit 200 of the automatic electronic flash device. A photo detector element for detecting a reflected light of an electronic flash, of the automatic electronic flash device, is used on a common basis with the PSD of the photo detector unit of the automatic focusing device, disposed behind the AF light detection window 13. According to the automatic electronic flash device, at the time of a photography a flash is projected to a camera subject, a reflected light from the camera subject is detected, and a flash emission is stopped at a timing that the reflected light reaches a predetermined light quantity.

The remote control device instructs an execution of an operation according to a received light from a remote control equipment for controlling the camera 10 in accordance with an emission of light directed to the camera 10. Here, the PSD of the photo detector unit of the automatic focusing device serves also as the photo detector element of the remote control device.

The camera 10 is further provided with a zoom finder window 14 constituting a zoom finder unit (not illustrated) and an AE detection window 15 for leading light to an internal AE sensor for an exposure adjustment. Further, on the top of the camera 10, there is provided a shutter button 18.

Figure 2:
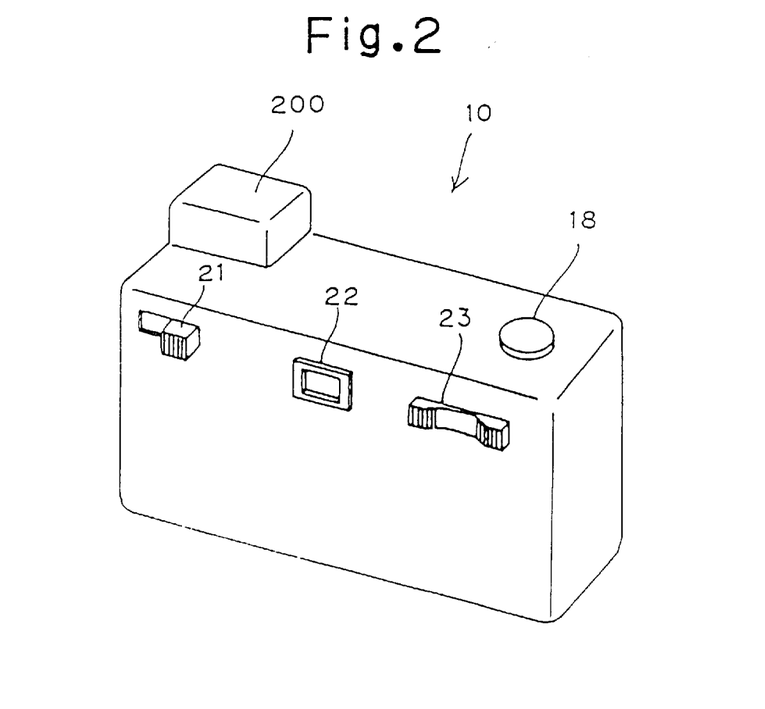
FIG. 2 is a perspective view of the camera shown in FIG. 1, looking obliquely upper from behind.

FIG. 2 is a perspective view of the camera shown in FIG. 1, looking obliquely upper from behind.

On the back of the camera 10, there is provided an electronic flash on/off switch 21 for selecting whether the automatic electronic flash device is to be operated at the time of photography, a finder eyepiece window 22 and a zoom operating lever 23 for operating the optical zoom lens 11a to a tele-side (a long distance side) or a wide-side (a short distance side).

The camera 10 thus constructed is improved in accuracy of focusing, and is small in a circuit scale and reduced in cost. Hereinafter, details of the camera 10 will be described.

Figure 3:
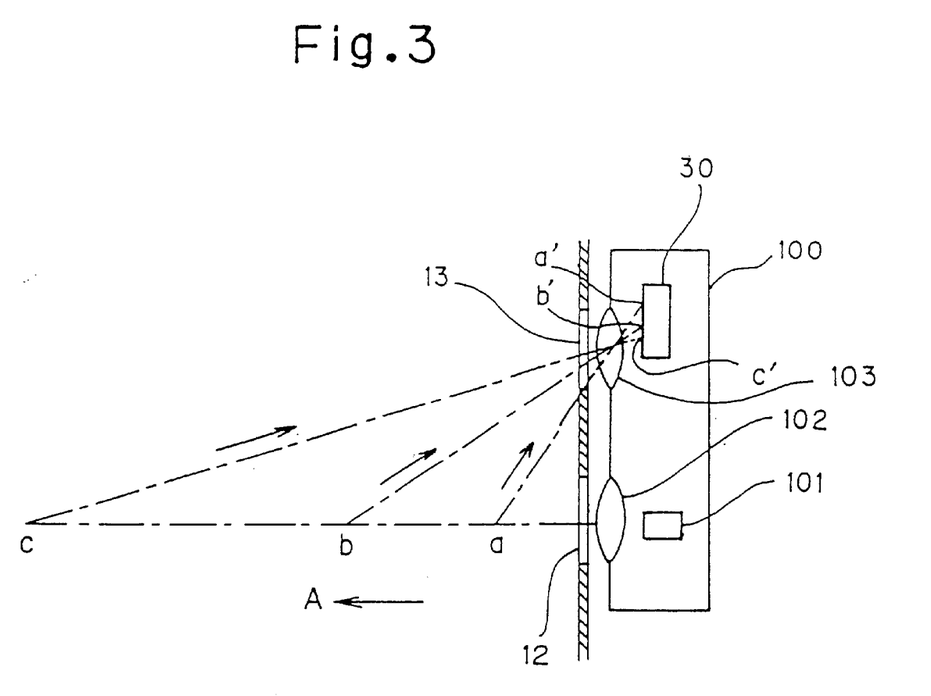
FIG. 3 is a typical illustration of an optical system of an automatic focusing device of the camera shown in FIG. 1.

FIG. 3 is a typical illustration of an optical system of an automatic focusing device of the camera shown in FIG. 1.

The camera 10 shown in FIG. 1 is provided with an AF unit 100. The AF unit 100 is provided with an LED 101, which is a light emitting diode for light projection disposed at the back of the AF light projection window 12 of the camera 10, and a projection lens 102 for narrowing a light beam emitted from the LED 101 down. At the back of the AF light detection window 13 of the camera 10, there is disposed an SPD 30, which is a kind of semiconductor photo detector element, and a photo detection lens 103 for condensing on the SPD 30 light emitted from the LED 101 and reflected on a camera subject (not illustrated).

Light for photometry emitted from the LED 101 travels via the projection lens 102 and the AF light projection window 12 forward (in an arrow A direction), and reflects on the camera subject (not illustrated). Incident light from the AF light detection window 13, of the reflected light, is condensed on the SPD 30 via the photo detection lens 103. Here, in the event that the camera subject is at a point a, light reflected on the point a is condensed onto an area extending somewhat taking a point a' of the SPD 30 as the center of gravity. In the event that the camera subject is at a point b, light reflected on the point b is condensed onto an area extending somewhat taking a point b' of the SPD 30 as the center of gravity, which is different from the point a'. In the event that the camera subject is at a point c, light reflected on the point c is condensed onto an area extending somewhat taking a point c' of the SPD 30 as the center of gravity, which is different from the points a' and b'. In this manner, the position of the center of gravity for condensing on the SPD 30 is varied in accordance with a distance of the camera subject from the camera 10. Consequently, it is possible to determine a distance of the camera subject through detecting a position of the center of gravity. The camera according to the present embodiment adopts a focusing according to this principle, when the camera subject is at the relatively short distance, as will be described later.

Further, while there exists an error due to a difference of a reflectance of the camera subject, when the camera subject is at the short distance, the strong light will be returned onto the SPD 30. On the other hand, when the camera subject is at the long distance, only the relatively weak light will be returned onto the SPD 30. Consequently, it is possible to determine a distance of the camera subject also through detecting on the SPD 30 the intensity (light quantity) of the light emitted from the LED 101 and reflected on the camera subject. The camera according to the present embodiment adopts a focusing according to this principle, when the camera subject is at the relatively long distance, as will be described later.

Figure 4:
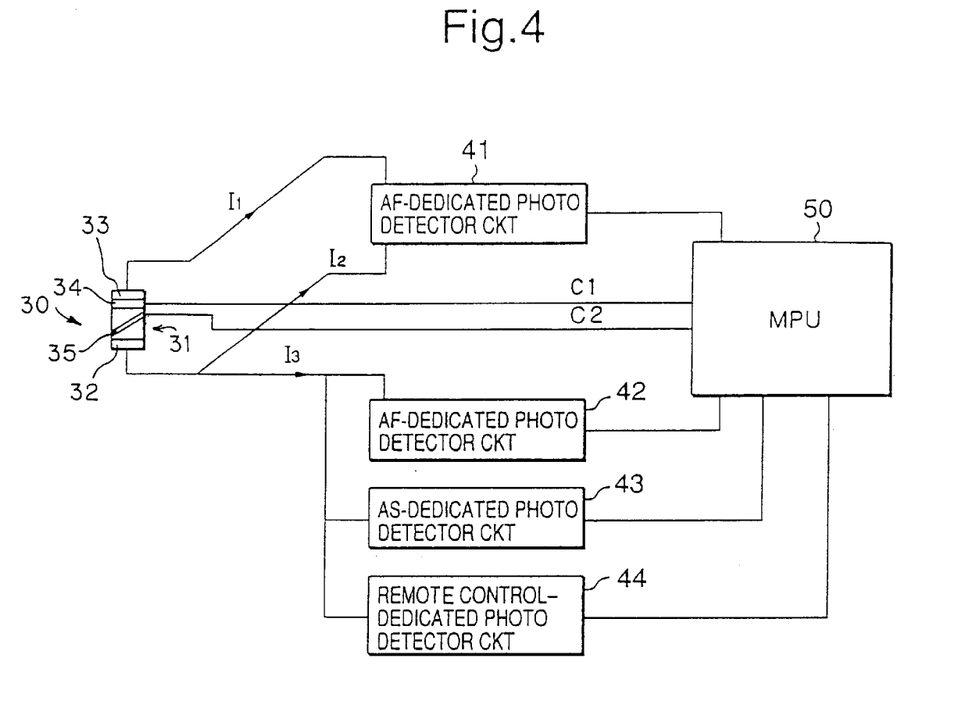
FIG. 4 is a circuit diagram of a photo detector unit of the camera shown in FIG. 1.
Figure 5:
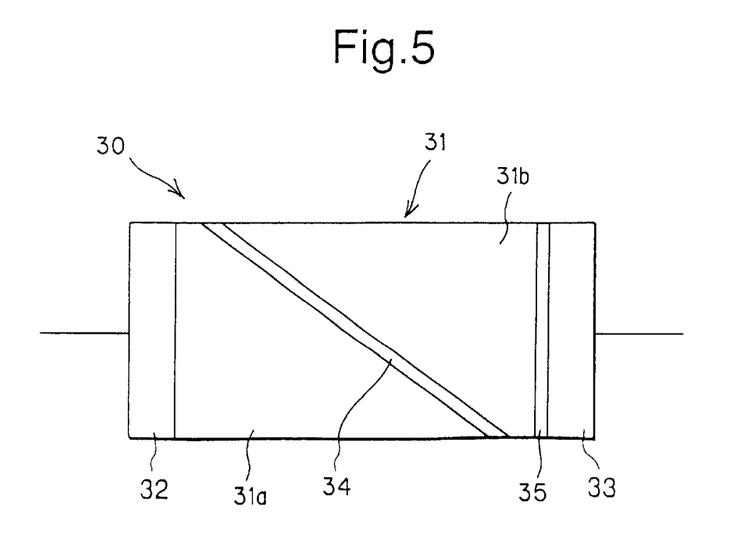
FIG. 5 is a typical illustration of an SPD element shown in FIG. 4.

FIG. 4 is a circuit diagram of a photo detector unit of the camera shown in FIG. 1. FIG. 5 is a typical illustration of the SPD shown in FIGS. 3 and 4.

A photo detector unit, as shown in FIG. 4, comprises the SPD 30, an AF-dedicated photo detector circuit 41 (corresponding to an example of a first distance operating unit referred to in the present invention), an AF-dedicated photo detector circuit 42 (corresponding to an example of a second distance operating unit referred to in the present invention), an AS (Auto Strobe)-dedicated photo detector circuit 43, a remote control-dedicated photo detector circuit 44, and an MPU 50. First, the SPD 30 will be explained referring to FIG. 5.

The SPD 30, as shown in FIG. 5, comprises a detection surface 31 for generating a photo-current upon receipt of irradiation of light. The detection surface 31 is divided into two parts of divided areas 31a and 31b. Signal electrodes 32 and 33 are provided in association with the divided areas 71a and 71b, respectively. The signal electrodes 32 and 33 are connected to the divided areas 31a and 31b, respectively, and output the photo-current generated by irradiation of light onto the detection surface 31.

The SPD 30 is provided with a first switch 34, disposed at a boundary between the divided areas 31a and 31b, for selectively offering a low impedance state which permits the photo-current generated on the detection surface 31 to conduct through the boundary, and a high impedance state which inhibits the photo-current generated on the detection surface 31 from conducting through the boundary, in accordance with a control signal.

The SPD 30 is further provided with a second switch 35, disposed at a position associated with the signal electrode 33 (corresponding to an example of another signal electrode referred to in the present invention) excepting one signal electrode 32 (corresponding to an example of one signal electrode referred to in the present invention) of the signal electrodes 32 and 33, for selectively offering a low impedance state which permits the photo-current generated on the detection surface 31 to conduct into the signal electrode 33, and a high impedance state which inhibits the photo-current generated on the detection surface 31 from conducting into the signal electrode 33, in accordance with a control signal which will be described later.

Figure 6:
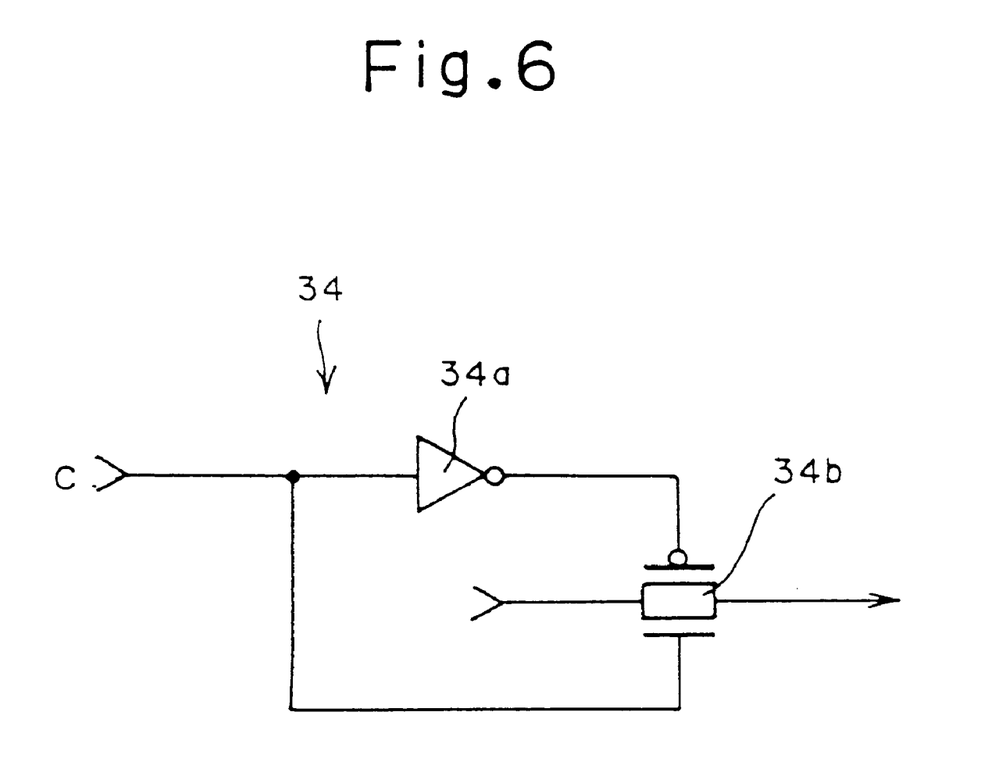
FIG. 6 is a circuit diagram of a switch constituting the SPD element shown in FIG. 5.

FIG. 6 is a circuit diagram of the first switch constituting the SPD element shown in FIG. 5.

The first switch 34 comprises a CMOS inverter 34a to which a control signal C is applied, and a CMOS transfer gate 34b connected to an input and an output of the CMOS inverter 34a. When a 'H' level of voltage is entered as the control signal C, the CMOS transfer gate 34b offers the low impedance state which permits the photo-current generated on the detection surface 31 to conduct through the boundary between the divided areas 31a and 31b, that is, the first switch 34. On the other hand, when a 'L' level of voltage is entered as the control signal C, the CMOS transfer gate 34b offers the high impedance state which inhibits the photo-current generated on the detection surface 31 from conducting through the boundary between the divided areas 31a and 31b.

The second switch 35 is the same as the first switch 34 in structure. When a 'H' level of voltage is entered as the control signal C, the CMOS transfer gate 34b offers the low impedance state which permits the photo-current generated on the detection surface 31 to conduct into the signal electrode 35. On the other hand, when a 'L' level of voltage is entered as the control signal C, the CMOS transfer gate 34b offers the high impedance state which inhibits the photo-current generated on the detection surface 31 from conducting into the signal electrode 35. At that time, if the first switch 34 is in the low impedance state, the photo-current generated on the detection surface 31 conducts through the signal electrode 32 in its entirety without separating into the signal electrodes 32 and 33.

Again referring to FIG. 4, the explanation will be continued.

The MPU 50 shown in FIG. 4 generates and transmits to the SPD 30 control signals C1 and C2 to change over the states of the first switch 34 and the second switch 35 in such a manner that when one of the first switch 34 and the second switch 35 offers the low impedance state, another switch offers the high impedance state.

The AF-dedicated photo detector circuit 41 determines a distance up to a camera subject in accordance with two types of photo-current $I_1$ and $I_2$ obtained through the signal electrodes 32 and 33, in a state that the control signals C1 and C2 for changing over the first switch 34 to the high impedance state and the second switch 35 to the low impedance state are transmitted to the SPD 30 by the MPU 50.

The AF-dedicated photo detector circuit 42 determines a distance up to a camera subject in accordance with photo-current $I_3$ obtained through the signal electrode 72, in a state that the control signals C1 and C2 for changing over the first switch 34 to the low impedance state and the second switch 35 to the high impedance state are transmitted to the SPD 30 by the MPU 50.

The AS-dedicated photo detector circuit 43 integrates the photo-currents from the signal electrode 32, which are obtained in such a manner that a flash is emitted from the light emission unit 200 of the automatic electronic flash device and a reflected light from the camera subject is detected by the SPD 30, and outputs a signal to stop a flash emission at a timing that the reflected light reaches a predetermined quantity of reflected light, in a state that the control signals C1 and C2 for changing over the first switch 34 to the low impedance state and the second switch 35 to the high impedance state are transmitted to the SPD 30 by the MPU 50. This signal is transmitted to a flash emission stop control unit (not illustrated) and the MPU 90 as well. Upon receipt of this signal, the flash emission stop control unit performs a stop processing for flash emission, and the MPU 90 performs a control such as a shutter close.

The remote control-dedicated photo detector circuit 44 generates and outputs to the MPU 50 a signal indicative of the fact that light from a remote control equipment is detected in accordance with the photo-current from the signal electrodes 32 obtained through detection of light from the remote control equipment by the SPD 30, in a state that the control signals C1 and C2 for changing over the first switch 34 to the low impedance state and the second switch 35 to the high impedance state are transmitted to the SPD 30 by the MPU 50.

According to the camera 10 of the present embodiment, as will be described later in detail, in the event that a photography is performed at the relatively short distance, the first and second switches 34 and 35 of the SPD 30 are switched by the MPU 50 to offer the high impedance state and the low impedance state, respectively. Thus, the AF-dedicated photo detector circuit 41 determines a distance up to a camera subject in accordance with both the photo-currents $I_1$ and $I_2$ obtained through the signal electrodes 32 and 33 of the SPD 30. On the other hand, in the event that the AF-dedicated photo detector circuit 41 determines a distance up to the camera subject in a manner as mentioned above, and as a result when the distance thus determined is the relatively long distance, the MPU 50 switches the first and second switches 34 and 35 of the SPD 30 to offer the low impedance state and the high impedance state, respectively, so that the AF-dedicated photo detector circuit 42 determines a distance up to the camera subject in accordance with photo-current $I_3$ obtained from the signal electrode 32 of the SPD 30. In this manner, in the event that a photography is performed at the relatively long distance, there is performed a processing of determining a distance up to the subject in accordance with a total quantity of light.

Hereinafter, there will be explained a focusing algorithm in the camera 10.

As a data arithmetic procedure for an active type of automatic focusing (AF) device, a ratio arithmetic procedure is well known.

In the event that the AF device is constructed with a low cost, an arithmetic output result of the AF block is fixed on the ratio arithmetic procedure. Thus, it is difficult to obtain the data arithmetic output according to the state of the subject.

For this reason, according to a camera of the present embodiment, in order that the conventional AF data arithmetic procedure is used to output an arithmetic result other than ratio arithmetic data, so that a long distance performance is improved, the camera 10 performs the following operation.

In the ratio arithmetic procedure, the following expression is given.

$$R=N/(N+F) \text{ or } R=F/(N+F) \qquad (1)$$

Where R denotes output data, N: a short distance side signal, and F: a long distance side signal.

With respect to this R, a relation of $R=\alpha \times (1/L)$ applies for the subject distance L, where $\alpha$ is determined in accordance with the AF system. In the camera 10, the ratio arithmetic procedure is adopted for the short distance photography, and the AF-dedicated photo detector circuit 41 performs the arithmetic processing in accordance with the ratio arithmetic procedure.

On the other hand, in the event that the long distance side signal F is fixed on the signal C, and the short distance side signal is replaced by P=(N+F) which denotes a total value of N and F in case of the ratio operation, from the formula (1), $$R'=P/(P+C) \text{ or } R'=C/(P+C) \qquad (2)$$

is outputted in form of the arithmetic result.

Here, in the event that a total value (N+F) of N and F in case of a specific distance $L_o$ is given by $P_0$, and R' determined in accordance with equation (2) is given by $R_0$, the following expression is given.

$$P_0=R_0 \times C/(1-R_0) \text{ or } P_0=(1-R_0) \times C/R_0 \qquad (3)$$

With respect to an arbitrary distance L and the associated total value P, $$P=P_0 \times (L_0/L)^2 \qquad (4)$$

is established.

From equations (2) and (4), the distance L is expressed through P by R' as follows:

$$L=\sqrt{\{(1-R') \times P_0/(R' \times C)\}} \times L_0$$

Or $$L=\sqrt{\{R' \times P_0/((1-R') \times C)\}} \times L_O \qquad (5)$$

With respect to the distance L, a derivation method, which is the same as the ratio arithmetic processing, is used to derive focusing data from light quantity P. According to the camera 10 of the present embodiment, in the event that a photography is performed at a relatively long distance, the AF-dedicated photo detector circuit 42 performs a distance arithmetic processing based on the light quantity as mentioned above, so that a distance up to the subject is determined. In this manner, changing over the focusing algorithm makes it possible to improve the accuracy of the focusing in the long distance photography.

While FIG. 4 shows individually two the AF-dedicated photo detector circuits 41 and 42 with individual blocks, it is not always needed that two the AF-dedicated photo detector circuits 41 and 42 are provided individually. It is acceptable that a single AF-dedicated photo detector circuit, which is serves as both a first distance arithmetic unit and a second distance arithmetic unit referred to in the present invention, is provided.

Next, there will be explained a series of sequence operation of the camera 10 with reference to FIGS. 1 and 4. Here, for the purpose of explanation of the whole, there will be explained a photography using all of three of the automatic focusing device, an automatic electronic flash device and the remote control device.

At the initial state, the MPU 50 outputs the control signals C1 and C2 so that the first and second switches 34 and 35 offer the low impedance state and the high impedance state, respectively. Consequently, the SPD 30 is in a light quantity mode in which an amount of light is simply detected. In this condition, light indicative of an instruction of execution of a self-timer operation is applied to the AF light detection window 13 from an external remote control equipment. This light is detected by the SPD 30 and fed through the remote control-dedicated photo detector circuit 44 to the MPU 50. Upon receipt of a signal related to the detected light, the MPU 50 starts execution of a series of sequence for photography and changes the control signals C1 and C2 so that the first and second switches 34 and 35 offer the high impedance state and the low impedance state, respectively. Thus, the SPD 30 is in a mode in which the photo-current is outputted from both the signal electrodes 32 and 33. Next, when the process goes to a step for performing a focusing, of a series of sequence for photography, the AF-dedicated photo detector circuit 41 performs a focusing in such a manner that light is projected from the light projection unit through the AF light projection window 12 in front of the camera 10, and light reflected on the camera subject is detected through the AF light detection window 13 by the SPD 30. Data obtained through the focusing is fed to the MPU 50.

When the MPU 50 decides that the entered data is data indicative of the relatively short distance, the MPU 50 performs a control of lens driving for focusing in accordance with the data thus decided.

On the other hand, when the MPU 50 decides that the entered data is data indicative of the relatively long distance, the MPU 50 changes the control signals C1 and C2 so that the first and second switches 34 and 35 offer the low impedance state and the high impedance state, respectively, and as a result the SPD 30 is set to the light quantity mode. Next, the AF-dedicated photo detector circuit 42 performs a focusing in such a manner that light is projected from the light projection unit through the AF light projection window 12 in front of the camera 10, and light reflected on the camera subject is detected through the AF light detection window 13 by the SPD 30. Data obtained through the focusing is fed to the MPU 50. The MPU 50 performs a control of lens driving for focusing in accordance with the data thus obtained through the focusing.

Next, in the event that the first and second switches 34 and 35 still offer the high impedance state and the low impedance state, the MPU 50 causes the first and second switches 34 and 35 to offer the low impedance state and the high impedance state so that the SPD 30 is set to the light quantity mode. After a predetermined time by a self-timer elapses, the MPU 50 causes the shutter operation to be executed, so that a flash is emitted from the light emission unit 200 to a camera subject. Light reflected from the camera subject is detected by the SPD 30 and converted into a photo-current, and the photo-current is fed to the AS-dedicated photo detector circuit 43. The AS-dedicated photo detector circuit 43 integrates the photo-current and outputs a signal to stop the flash emission at the timing when an integrated value of the photo-current reaches a predetermined amount of reflected light. This signal is transmitted to a flash emission stop control unit (not illustrated) to perform a processing of stopping a flash emission, and is transmitted also to the MPU 50. The MPU 50 performs a control of the shutter close and the like in response to this signal. Through a series of sequence as mentioned above, a self-timer operation is performed in accordance with an instruction from an external remote control equipment, so that a photography by the electronic flash is performed.

As mentioned above, according to the camera 10 of the present embodiment, in the event that a photography is performed at a relatively long distance, the MPU 50 switches the first and second switches 34 and 35 of the SPD 30 to offer the low impedance state and the high impedance state, respectively, so that the AF-dedicated photo detector circuit 42 determines a distance up to the camera subject in accordance with an amount of reflected light. Thus, it is possible to improve an accuracy of focusing in connection with focusing of long distance. Further, according to the camera 10, the single SPD 30 is used to detect three types of light, that is, light emitted from the remote control equipment, light for focusing reflected on the subject, and flash reflected on the subject. Therefore, according to the camera 10 of the present embodiment, as compared with the conventional camera provided with a photo detector on each device, the number of photo detectors can be reduced, and it is possible to reduce the cost.

Next, there will be explained a camera according to an alternative embodiment of the present invention.

The camera, which will be explained hereinafter, is identical to that shown in FIGS. 1 to 3 in connection with the appearance and the structure of the AF unit. Accordingly, here, there will be described a circuit for a photo detector unit and a semiconductor photo detector element, which correspond to those shown in FIGS. 4 and 5, respectively.

Figure 7:
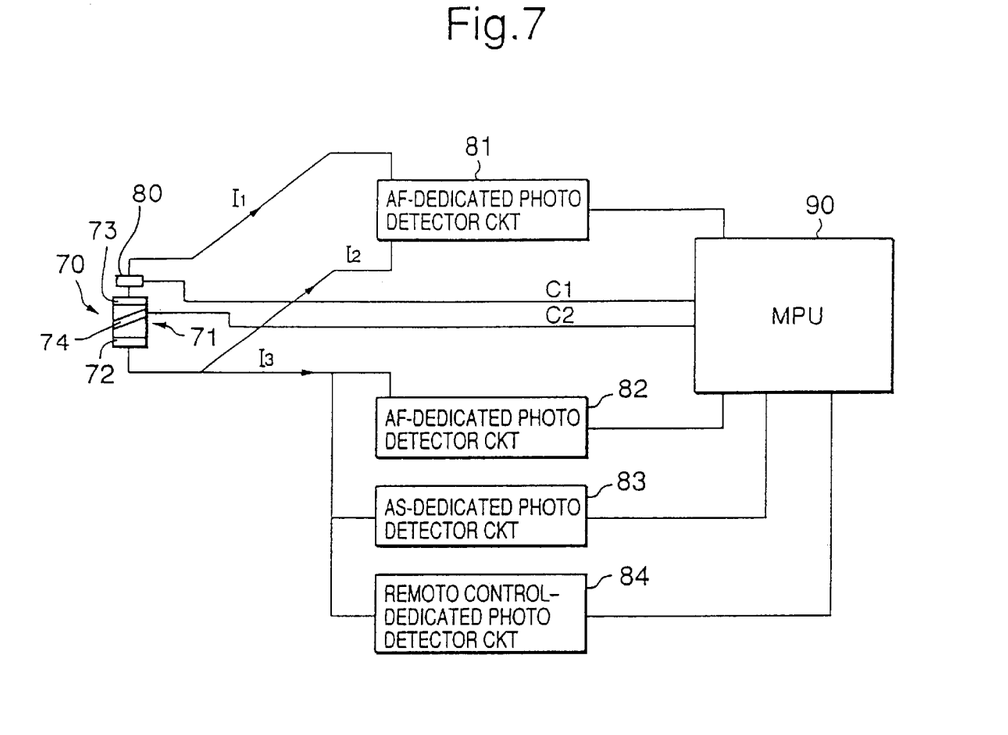
FIG. 7 is a circuit diagram of a photo detector unit of the camera according to an alternative embodiment of the present invention.
Figure 8:
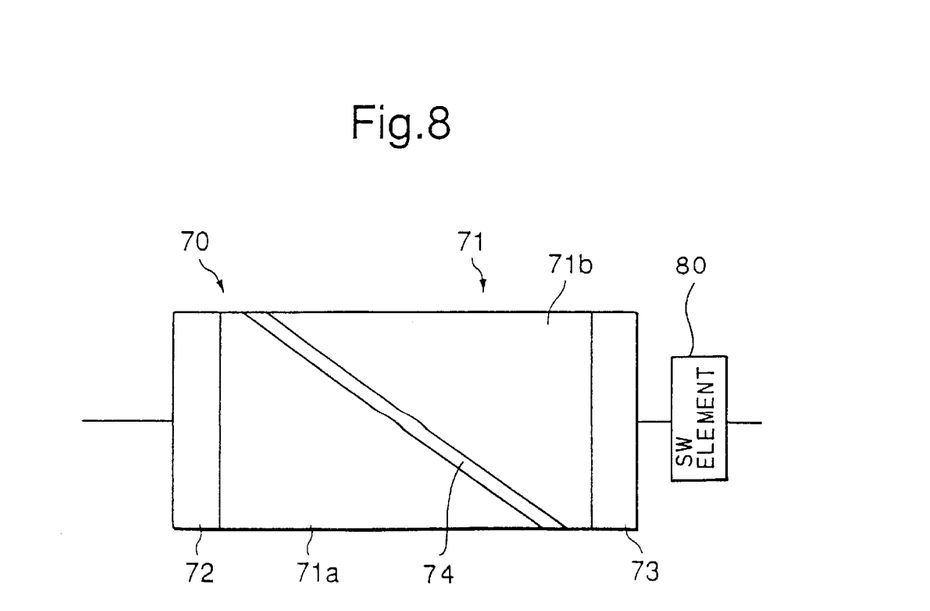
FIG. 8 is a typical illustration of an SPD element shown in FIG. 7 and a switch element adjacent to the SPD element.

FIG. 7 is a circuit diagram of a photo detector unit of the camera according to an alternative embodiment of the present invention. FIG. 8 is a typical illustration of an SPD element shown in FIG. 7 and a switch element adjacent to the SPD element.

The photo detector unit of the camera shown in FIG. 7 comprises an SPD 70, a switch element 80, an AF-dedicated photo detector circuit 81 (corresponding to an example of a first distance operating unit referred to in the present invention), an AF-dedicated photo detector circuit 82 (corresponding to an example of a second distance operating unit referred to in the present invention), an AS (Auto Strobe)-dedicated photo detector circuit 83, a remote control-dedicated photo detector circuit 84, and an MPU 90. First, the SPD 70 will be explained referring to FIG. 8.

The SPD 70, as shown in FIG. 8, comprises a detection surface 71 for generating a photo-current upon receipt of irradiation of light. The detection surface 71 is divided into two parts of divided areas 71a and 71b. Signal electrodes 72 and 73 are provided at both ends of the detection surface 71 in association with the divided areas 71a and 71b, respectively. The signal electrodes 72 and 73 are connected to the divided areas 71a and 71b, respectively, and output the photo-current generated by irradiation of light onto the detection surface 71.

The SPD 70 is provided with a first switch 74, disposed at a boundary between the divided areas 71a and 71b, for selectively offering a low impedance state which permits the photo-current generated on the detection surface 71 to conduct through the boundary, and a high impedance state which inhibits the photo-current generated on the detection surface 71 from conducting through the boundary, in accordance with a control signal.

The first switch 74 has the same structure as FIG. 6.

The SPD 70 according to the embodiment shown in FIGS. 7 and 8 is provided with no switch corresponding to the second switch 35 of the SPD 30 (cf. FIGS. 4 and 5) in the aforementioned embodiment. According to the embodiment shown in FIGS. 7 and 8, instead of the second switch, there is provided a switch element 80 on a flow path for the photo-current from the signal electrode 73, out of the SPD 70. In view of accuracy in detection of the photo-current, it is preferable that the switch element 80 is located at a position close to the SPD 70 as much as possible.

The MPU 90 shown in FIG. 7 generates and transmits to the switch element 80 and the SPD 70 control signals C1 and C2 to change over the states of the first switch 74 and the switch element 80 in such a manner that when one of the first switch 74 and the switch element 80 offers the low impedance state, another offers the high impedance state.

The AF-dedicated photo detector circuit 81 determines a distance up to a camera subject in accordance with two types of photo-current $I_1$ and $I_2$ obtained through the signal electrodes 72 and 73, in a state that the control signals C1 and C2 for changing over the switch element 80 to the low impedance state and the first switch 74 to the high impedance state are transmitted to the switch element 80 and the SPD 70, respectively, by the MPU 90.

The AF-dedicated photo detector circuit 82 determines a distance up to a camera subject in accordance with photo-current $I_3$ obtained through the signal electrode 72, in a state that the control signals C1 and C2 for changing over the switch element 80 to the high impedance state and the first switch 74 to the low impedance state are transmitted to the switch element 80 and the SPD 70, respectively, by the MPU 90.

The distance arithmetic algorithm in the AF-dedicated photo detector circuits 81 and 82 is the same as the AF-dedicated photo detector circuits 41 and 42 shown in FIG. 4. And thus the redundant description will be omitted.

The As-dedicated photo detector circuit 83 integrates the photo-currents from the signal electrode 72, which are obtained in such a manner that a flash is emitted from the light emission unit 200 of the automatic electronic flash device and a reflected light from the camera subject is detected by the SPD 70, and outputs a signal to stop a flash emission at a timing that the reflected light reaches a predetermined quantity of reflected light, in a state that the control signals C1 and C2 for changing over the switch element 80 to the high impedance state and the first switch 74 to the low impedance state are transmitted to the switch element 80 and the SPD 70, respectively, by the MPU 90. This signal is transmitted to a flash emission stop control unit (not illustrated) and the MPU 90 as well. Upon receipt of this signal, the MPU 90 performs a control such as a shutter close.

The remote control-dedicated photo detector circuit 84 generates and outputs to the MPU 90 a signal indicative of the fact that light from a remote control equipment is detected in accordance with the photo-current from the signal electrodes 72 obtained through detection of light from the remote control equipment by the SPD 70, in a state that the control signals C1 and C2 for changing over the switch element 80 to the high impedance state and the first switch 74 to the low impedance state are transmitted to the switch element 80 and the SPD 70, respectively, by the MPU 90. Upon receipt of this signal, the MPU 70 starts an execution of a series of sequence for photography consisting of a measurement of distance up to a camera subject, a measurement of brightness on a field, a shutter switching, a film winding up and so on.

According to the camera having the photo detector unit shown in FIG. 7, the single SPD 70 is used to detect three types of light, that is, light emitted from the remote control equipment, light for focusing reflected on the subject, and flash reflected on the subject. Therefore, according to the camera of the present embodiment, in a similar fashion to that of the aforementioned embodiment, as compared with the conventional camera provided with a photo detector on each device, the number of photo detectors can be reduced, and it is possible to reduce the cost.

Incidentally, according to the cameras of the above-mentioned embodiments of the present invention, the cameras are explained in combination of three of the automatic focusing device, the automatic electronic flash device and the remote control device. However, the camera of the present invention is not restricted to this three combination. It is acceptable to adopt two combination of the automatic focusing device and the automatic electronic flash device each having the AF-dedicated photo detector circuit and the AS-dedicated photo detector circuit, or alternative two combination of the automatic focusing device and the remote control device each having the AF-dedicated photo detector circuit and the remote control-dedicated photo detector circuit. Alternatively, regardless of the combination of the automatic focusing device with the automatic electronic flash device or the remote control device, in order to enhance an accuracy of the focusing, it is acceptable to provide a camera having an automatic focusing device provided with two AF-dedicated photo detector circuits which are mutually different in a focusing system.

Further, the present invention is not confined to the usual type of camera performing a photography on a roll-like shape of photographic film, but applicable to any type of cameras such as an instant camera in which a film is taken out of the camera while being developed, and an electronic still camera in which an image of a subject is formed on a CCD photo detector array and the image is derived in form of a signal.

As mentioned above, according to the present invention, it is possible to implement a camera improved in an accuracy of focusing and reduced in cost with a small scale of circuit.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A distance measuring equipment comprising:
   a light projecting unit for projecting light for a distance measurement; and
   a photo detector unit, having a light detection window disposed at an interval of a predetermined distance from said light projecting unit in a direction intersecting with a direction of travel of light projected from said light projecting unit, for determining a distance up to a subject in such a manner that light is projected from said light projecting unit, and light reflected on the subject is detected through said light detection window,
   wherein said photo detector unit comprises:
   a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal;
   a first distance arithmetic unit for determining a distance up to the subject in accordance with a plurality of photo-currents derived through said signal electrodes, in a state that said first switch is changed over to the second state; and
   a second distance arithmetic unit for determining a distance up to the subject in accordance with the photo-current derived through a first signal electrode which is one of said signal electrodes, in a state that said first switch is changed over to the first state.

2. A distance measuring equipment according to claim 1, wherein said semiconductor photo detector element further comprises a second switch, provided in association with another signal electrode excepting said first signal electrode, for selectively offering a first state which permits the photo-current generated on said detection surface to conduct into the associated signal electrode, and a second state which inhibits the photo-current generated on said detection surface from conducting into the associated signal electrode, in accordance with a control signal,
   said first distance arithmetic unit determines a distance up to the subject in accordance with a plurality of photo-currents derived through said signal electrodes, in a state that said first switch is changed over to the second state, and said second switch is changed over to the first state, and
   a second distance arithmetic unit for determining a distance up to the subject in accordance with the photo-current derived through said first signal electrode, in a state that said first switch is changed over to the first state, and said second switch is changed over to the second state.

3. A distance measuring equipment according to claim 1, wherein said semiconductor photo detector element further comprises a switch element, provided in association with another signal electrode excepting said first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, said first distance arithmetic unit determines a distance up to the subject in accordance with a plurality of photo-currents derived through said signal electrodes, in a state that said first switch is changed over to the second state, and said switch element is changed over to the first state, and a second distance arithmetic unit for determining a distance up to the subject in accordance with the photo-current derived through said first signal electrode, in a state that said first switch is changed over to the first state, and said switch element is changed over to the second state.

4. A distance measuring equipment according to claim 1, wherein said first state is a low impedance state, and said second state is a high impedance state.

5. A camera loaded with a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said photo detector unit comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal;

a control unit for generating a control signal to change over said first switch and transmitting the control signal to said semiconductor photo detector element;

a first distance arithmetic unit for determining a distance up to the subject in accordance with a plurality of photo-currents derived through said signal electrodes, in a state that a control signal to change over said first switch to said second state is transmitted to said semiconductor photo detector element by said control unit; and a second distance arithmetic unit for determining a distance up to the subject in accordance with the photo-current derived through a first signal electrode which is one of said signal electrodes, in a state that a control signal to change over said first switch to said first state is transmitted to said semiconductor photo detector element by said control unit.

6. A camera loaded with a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, said semiconductor photo detector element being used on a common basis for said flash emission device and said distance measuring equipment and serving to detect both flash reflected on the subject and incident through said light detection window and light for focusing reflected on the subject and incident through said light detection window; and a control unit for generating a control signal to change over said first switch between said first state and said second state and transmitting the control signal to said semiconductor photo detector element.

7. A camera loaded with a remote control device responsive to light from a remote control equipment for controlling the camera in accordance with an emission of light directed to the camera for instructing an execution of operation according to detection of the light, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, said semiconductor photo detector element being used on a common basis for said remote control device and said distance measuring equipment and serving to detect both light emitted from said remote control equipment and incident through said light detection window and light for focusing reflected on the subject and incident through said light detection window; and a control unit for generating a control signal to change over said first switch between said first state and said second state and transmitting the control signal to said semiconductor photo detector element.

8. A camera loaded with a remote control device responsive to light from a remote control equipment for controlling the camera in accordance with an emission of light directed to the camera for instructing an execution of operation according to detection of the light, a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:
a semiconductor photo detector element comprising a detection surface for generating a photo-current upon receipt of irradiation of light, signal electrodes, connected to associated divided areas of said detection surface, respectively, adapted for outputting the photo-current generated by irradiation of light onto said detection surface, and a first switch, disposed at a boundary between divided areas of said detection surface, for selectively offering a first state which permits the photo-current generated on said detection surface to conduct through the associated boundary, and a second state which inhibits the photo-current generated on said detection surface from conducting through the associated boundary, in accordance with a control signal, said semiconductor photo detector element being used on a common basis for said remote control device, said flash emission device and said distance measuring equipment and serving to detect three types of light emitted from said remote control equipment and incident through said light detection window, flash reflected on the subject and incident through said light detection window and light for focusing reflected on the subject and incident through said light detection window; and a control unit for generating a control signal to change over said first switch between said first state and said second state and transmitting the control signal to said semiconductor photo detector element.

9. A camera according to claim 5, wherein said semiconductor photo detector element further comprises a second switch, provided in association with another signal electrode excepting the first signal electrode which is one of said signal electrodes, for selectively offering a first state which permits the photo-current generated on said detection surface to conduct into the associated signal electrode, and a second state which inhibits the photo-current generated on said detection surface from conducting through the associated signal electrode, in accordance with a control signal, and said control unit generates a control signal to change over said first switch and said second switch in such a manner that when one of said first switch and said second switch is in the first state, another switch is in the second state, and transmits the control signal to said semiconductor photo detector element.

10. A camera according to claim 6, wherein said semiconductor photo detector element further comprises a second switch, provided in association with another signal electrode excepting the first signal electrode which is one of said signal electrodes, for selectively offering a first state which permits the photo-current generated on said detection surface to conduct into the associated signal electrode, and a second state which inhibits the photo-current generated on said detection surface from conducting through the associated signal electrode, in accordance with a control signal, and said control unit generates a control signal to change over said first switch and said second switch in such a manner that when one of said first switch and said second switch is in the first state, another switch is in the second state, and transmits the control signal to said semiconductor photo detector element.

11. A camera according to claim 7, wherein said semiconductor photo detector element further comprises a second switch, provided in association with another signal electrode excepting the first signal electrode which is one of said signal electrodes, for selectively offering a first state which permits the photo-current generated on said detection surface to conduct into the associated signal electrode, and a second state which inhibits the photo-current generated on said detection surface from conducting through the associated signal electrode, in accordance with a control signal, and said control unit generates a control signal to change over said first switch and said second switch in such a manner that when one of said first switch and said second switch is in the first state, another switch is in the second state, and transmits the control signal to said semiconductor photo detector element.

12. A camera according to claim 8, wherein said semiconductor photo detector element further comprises a second switch, provided in association with another signal electrode excepting the first signal electrode which is one of said signal electrodes, for selectively offering a first state which permits the photo-current generated on said detection surface to conduct into the associated signal electrode, and a second state which inhibits the photo-current generated on said detection surface from conducting through the associated signal electrode, in accordance with a control signal, and said control unit generates a control signal to change over said first switch and said second switch in such a manner that when one of said first switch and said second switch is in the first state, another switch is in the second state, and transmits the control signal to said semiconductor photo detector element.

13. A camera according to claim 5, wherein said semiconductor photo detector element further comprises a switch element, provided in association with another signal electrode excepting the first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, and said control unit generates a control signal to change over said first switch and said switch element in such a manner that when one of said first switch and said switch element is in the first state, another switch is in the second state, and transmits the control signal to said semiconductor photo detector element and said switch element.

14. A camera according to claim 6, wherein said semiconductor photo detector element further comprises a switch element, provided in association with another signal electrode excepting the first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, and said control unit generates a control signal to change over said first switch and said switch element in such a manner that when one of said first switch and said switch element is in the first state, another switch is in the second state, and transmits the control signal to said semiconductor photo detector element and said switch element.

15. A camera according to claim 7, wherein said semiconductor photo detector element further comprises a switch element, provided in association with another signal electrode excepting the first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, and said control unit generates a control signal to change over said first switch and said switch element in such a manner that when one of said first switch and said switch element is in the first state, another switch is in the second state, and transmits the control signal to said semiconductor photo detector element and said switch element.

16. A camera according to claim 8, wherein said semiconductor photo detector element further comprises a switch element, provided in association with another signal electrode excepting the first signal electrode of said signal electrodes, and connected to the associated signal electrode, for selectively offering a first state which permits the photo-current generated on said detection surface to conduct through the associated signal electrode, and a second state which inhibits the photo-current generated on said detection surface from conducting through the associated signal electrode, in accordance with a control signal, and said control unit generates a control signal to change over said first switch and said switch element in such a manner that when one of said first switch and said switch element is in the first state, another switch is in the second state, and transmits the control signal to said semiconductor photo detector element and said switch element.

* * * * *